United States Patent
Brand et al.

(10) Patent No.: US 10,247,068 B2
(45) Date of Patent: Apr. 2, 2019

(54) OIL SEPARATING MODULE IN THE CRANKCASE VENTILATION SYSTEM OF A COMBUSTION ENGINE

(71) Applicant: BRUSS Sealing Systems GmbH, Hoisdorf (DE)

(72) Inventors: Manfred Brand, Tremsbuettel (DE); Doerte Petigk, Hoisdorf (DE); Thomas Schrader, Hamburg (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 98 days.

(21) Appl. No.: 15/191,170

(22) Filed: Jun. 23, 2016

(65) Prior Publication Data

US 2016/0363015 A1    Dec. 15, 2016

Related U.S. Application Data

(63) Continuation-in-part of application No. 14/315,112, filed on Jun. 25, 2014, now Pat. No. 9,416,695.

(30) Foreign Application Priority Data

Jun. 25, 2013  (DE) .................. 10 2013 212 104

(51) Int. Cl.
*F01M 13/04*   (2006.01)
*F02F 7/00*    (2006.01)
(Continued)

(52) U.S. Cl.
CPC ........ *F01M 13/04* (2013.01); *F01M 13/0405* (2013.01); *F02F 7/006* (2013.01);
(Continued)

(58) Field of Classification Search
CPC ....... F01M 2013/0494; F01M 13/0416; F01M 13/0011; F01M 13/04; F01M 13/0405; F16K 15/04; F02F 7/006
See application file for complete search history.

(56) References Cited

U.S. PATENT DOCUMENTS

| | | | | |
|---|---|---|---|---|
| 2,415,339 A | * | 2/1947 | Curtis | A47J 31/043 215/227 |
| 2,493,617 A | * | 1/1950 | Chubbuck | F01M 13/04 123/196 A |

(Continued)

FOREIGN PATENT DOCUMENTS

| | | |
|---|---|---|
| AU | 2002301037 | 6/2003 |
| DE | 296 05 425 | 3/1996 |

(Continued)

*Primary Examiner* — Mary McManmon
*Assistant Examiner* — Nicole Gardner
(74) *Attorney, Agent, or Firm* — Saliwanchik, Lloyd & Eisenschenk

(57) ABSTRACT

An oil separating module for an internal combustion engine, including: an oil separator, an oil return arranged such that separated oil can flow through the oil return to an oil sump, a mounting, and a non-return valve having: a valve housing having a throughbore with a first end opening and a second end opening, and a valve body movably mounted in the valve housing such that the valve body transitions between an open position and a closed position. When the first end opening is above the second end opening, the valve body automatically transitions to, or remains in, the closed position when a second end opening pressure is greater than a first end opening pressure by at least a threshold pressure difference, and the valve body automatically transitions to, or remains in, the open position when the second pressure is not greater than the first pressure by at least the threshold pressure difference.

11 Claims, 13 Drawing Sheets

(51) Int. Cl.
*F16K 15/04* (2006.01)
*F01M 13/00* (2006.01)

(52) U.S. Cl.
CPC ..... *F16K 15/04* (2013.01); *F01M 2013/0044* (2013.01); *F01M 2013/0438* (2013.01); *F01M 2013/0494* (2013.01); *Y10T 137/7904* (2015.04)

(56) References Cited

U.S. PATENT DOCUMENTS

| | | | | |
|---|---|---|---|---|
| 2,757,752 | A * | 8/1956 | Kaufman | F16K 15/04 137/433 |
| 3,362,386 | A * | 1/1968 | McMahon | F01M 13/023 123/568.12 |
| 3,765,386 | A | 10/1973 | Ottofy | |
| 3,941,145 | A | 3/1976 | Morain et al. | |
| 4,071,045 | A * | 1/1978 | Brandt | F16K 15/04 137/528 |
| 4,602,595 | A | 7/1986 | Aoki et al. | |
| 4,637,426 | A | 1/1987 | Lyon | |
| 4,667,647 | A * | 5/1987 | Ohtaka | F01M 5/001 123/573 |
| 6,293,268 | B1 * | 9/2001 | Mammarella | F01M 13/0011 123/574 |
| 6,684,864 | B1 | 2/2004 | Busen et al. | |
| 6,889,674 | B2 * | 5/2005 | Pateman | F01M 13/0416 123/574 |
| 7,080,636 | B2 | 7/2006 | Knaus et al. | |
| 7,137,372 | B2 | 11/2006 | Hilpert et al. | |
| 7,823,695 | B2 | 11/2010 | Rosendahl et al. | |
| 7,842,115 | B2 | 11/2010 | Brand et al. | |
| 8,267,071 | B2 | 9/2012 | Janssen et al. | |
| 2002/0066424 | A1 | 6/2002 | Fedorowicz et al. | |
| 2008/0196364 | A1 | 8/2008 | Brand et al. | |
| 2009/0263261 | A1 | 10/2009 | Hoffmann et al. | |
| 2013/0156613 | A1 * | 6/2013 | Reuter | B60T 17/02 417/313 |

FOREIGN PATENT DOCUMENTS

| | | | |
|---|---|---|---|
| DE | 195 15 482 | 10/1996 | |
| DE | 42 14 324 | 4/1998 | |
| DE | 198 13 702 | 8/1999 | |
| DE | 202 17 601 | 5/2004 | |
| DE | 20 2004 004 802 | 7/2004 | |
| DE | 20 2004 004 803 | 8/2004 | |
| DE | 203 02 911 | 8/2004 | |
| DE | 10 2004 002 310 | 8/2005 | |
| DE | 10 2004 006 082 | 8/2005 | |
| DE | 10 2004 018 567 | 12/2005 | |
| DE | 10 2004 061 938 | 6/2006 | |
| DE | 20 2007 011 585 | 11/2007 | |
| DE | 10 2006 038 700 | 2/2008 | |
| DE | 10 2007 058 569 | 8/2008 | |
| DE | 10 2007 008 672 | 9/2008 | |
| DE | 196 28 812 | 1/2009 | |
| DE | 10 2008 030 134 | 2/2009 | |
| DE | 20 2008 002 928 | 8/2009 | |
| DE | 10 2008 019 293 | 10/2009 | |
| EP | 1 090 210 | 4/2000 | |
| EP | 1147992 | 10/2001 | |
| EP | 1 614 871 | 7/2005 | |
| EP | 1559876 | 8/2005 | |
| EP | 1790836 A2 * | 5/2007 | ............ F01M 13/04 |
| FR | 2932843 | 12/2002 | |
| JP | 2002-322944 | 11/2002 | |
| WO | WO-1998/032955 | 7/1998 | |
| WO | WO-2004/090292 | 10/2004 | |

* cited by examiner

OIL SEPARATING MODULE IN THE CRANKCASE VENTILATION SYSTEM OF A COMBUSTION ENGINE

RELATED APPLICATION

This application is a continuation-in-part of U.S. patent application Ser. No. 14/315,112, filed on Jun. 25, 2014, which claims priority under 35 U.S.C. § 119(e) of German Patent Application No. DE 10 2013 212 104.0, filed on Jun. 25, 2013, the disclosures of which are both hereby incorporated by reference in their entireties, including any tables and drawings.

BACKGROUND OF INVENTION

The invention relates to a non-return valve, a non-return valve for an oil return in the crankcase ventilation system of a combustion engine, and an oil separating module in the crankcase ventilation system of a combustion engine, with a non-return valve for an oil return, where the non-return valve includes a valve housing and a valve body which is mounted in the valve housing so as to be displaceable between an open position and a closed position, the valve body in the non-operating state of the combustion engine being maintained in the open position without preload and being configured to automatically move to the closed position in case of an overpressure at the crankcase side with respect to the oil separator chamber.

To reliably prevent the ingress of oil from the crankcase through the oil return into the cleanroom of the oil separator, and thus into the intake section, conventionally for example a siphon is arranged in the oil return, see DE 198 13 702 C1; DE 20 2004 004 803 U1, FIG. 7; DE 10 2004 006 082 A1. As at any time there is some oil in the siphon, the oil return runs the risk to freeze and consequently to become inoperative. The same applies to the embodiment according to FIG. 13 of DE 20 2004 004 803 U1, in which a sintered body is arranged in the oil return.

In addition, non-return valves are commonly known for the oil return of an oil separator in the crankcase ventilation system of a combustion engine.

Common types of non-return valves for example comprise an umbrella-shaped or plate-shaped elastomer body which in the neutral position of the engine is in the closed position, and which in case of a low pressure in the crankcase and/or at a predetermined level in an oil reservoir opens automatically, see U.S. Pat. No. 4,602,595; WO 98 32955 A1; DE 10 2004 002 310 A1; DE 20 2004 004 803 U1, FIG. 14; WO 2004 090292 A2. This non-generic design runs the risk to freeze in the non-operating state of the engine, as the oil cannot discharge.

The like applies to conventional flexible-tongue valves which in the neutral position of the engine are in the closed position, and which in case of a low pressure in the crankcase and/or at a predetermined level in an oil reservoir open automatically, see DE 10 2004 061 938 B3; EP 1 614 871 A2; DE 10 2006 038 700 A1, FIG. 4; DE 10 2008 030 134 A1; DE 10 2007 058 059 A1; DE 10 2007 008 672 A1; DE 10 2008 019 293 A1.

The spring diaphragm according to DE 296 05 425 U1 in the unloaded state owing to its own weight in fact is in an open position. However, the spring diaphragm in the open position hangs down loose so that the open position is not well-defined. For example, the flexible tongue cannot be prevented from sagging due to aging or high stress, being a potential risk to the operational capability of the non-return valve.

DE 20 2007 011 585 U1 discloses an oil return valve comprising a floating body located in a housing, which being subject to buoyant lift uncovers a discharge opening in the housing when a defined oil level is exceeded, and which being subject to gravity covers said opening when the oil level falls below a defined oil level.

EP 1 090 210 B1 discloses a cyclone separator comprising a valve ball arranged in the oil return, which being subject to gravity in the non-operating state of the engine closes the oil return.

All of the above-mentioned non-return valves have in common that in the non-operating state of the engine they do not provide the maximum opening diameter, being detrimental to the freezing behavior.

Another likewise non-generic design provides a controlled non-return valve which is opened in a pilot-operated manner by use of external power, for example compressed air or magnetic force, see DE 195 15 482 A1; DE 202 17 601 U1; DE 203 02 911 U1; DE 10 2004 018 567 B3. However, the realization of such pilot-operated valves is very complex. The same applies to flexible-tongue valves controlled by a pump according to DE 20 2004 004 802 U1 and DE 10 2008 019 293 A1.

A generic oil return non-return valve is known from DE 196 28 812 B4. The non-return valve includes a housing and a valve body which is mounted within the housing so as to be movable as a whole, the valve body in the non-operating state of the engine uncovering a maximum opening diameter, and during operation in case of an overpressure in the crankcase being lifted relative to the oil separator covering a through opening. This valve is inserted into a mounting of the crankcase, and there are provided circumferential sealing lips around the outer circumference of the valve housing having an outer diameter that is slightly larger than the diameter of the mounting so that the housing can be fittingly inserted into the mounting with frictional contact performing a sealing function and being adjustable. However, depending on the mounting position it is difficult to find a place for the non-return valve in the crankcase. Furthermore, the non-return valve for the engine manufacturer is an additional component to be mounted. Removing the non-return valve from the crankcase in the event of malfunction or failure, after all, involves great effort.

BRIEF SUMMARY

It is the object of the invention to provide a non-return valve, a cylinder head cover with a non-return valve, and/or an oil separating module with a non-return valve, that does not impose any special requirements on the engine manufacturer and, if necessary, can be removed with relatively small effort.

According to the invention, the non-return valve is provided and configured to be inserted into a cylinder head cover, or an oil separating module, of the combustion engine, so that no requirements need to be imposed on the engine manufacturer, as the non-return valve is mounted already when the cylinder head cover, or oil separating module, is produced and is delivered together with the cylinder head cover, or oil separating module. In the event of malfunction or failure, the non-return valve can be removed from the cylinder head cover, or oil separating module, with essentially less effort or can be replaced together with the entire cylinder head cover, or oil separating module.

DETAILED DISCLOSURE

Figure 1A:
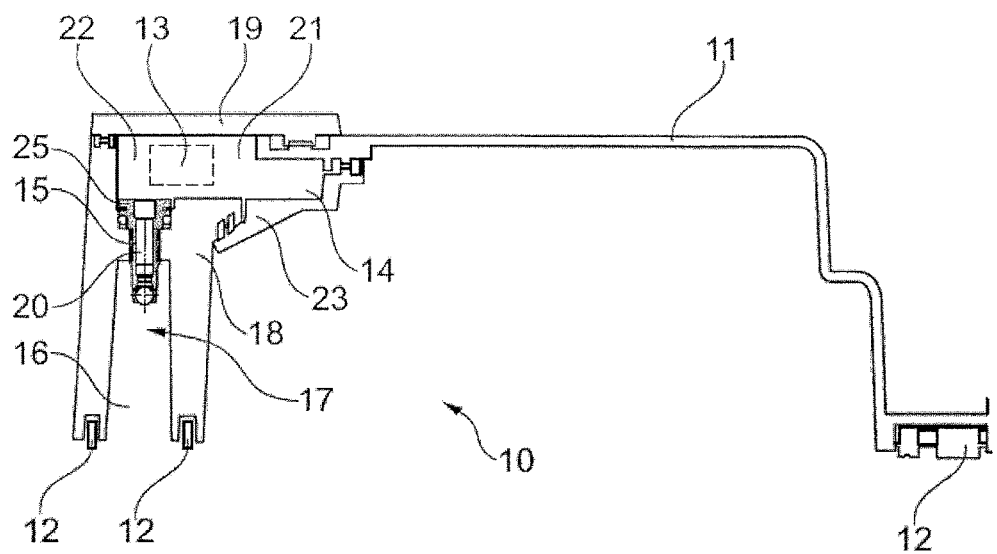
FIG. 1A shows a cross-sectional view through a cylinder head cover.

According to the invention, in the non-operating state of the combustion engine the valve body in particular being subject to gravity is maintained in the open position without preload. As a result of omitting a compressive spring for the valve body, the same can be moved quickly from the open position to the closed position. Even if there are only minor differences in pressure, the valve body is moved to the closed position and prevents the ingress of oil-loaded gas from the crankcase into the cleanroom of the oil separator.

The open position and closed position of the valve is realized solely by displacing the valve body as a whole. "As a whole" means that all parts fixedly connected to the valve body are displaced altogether. In particular, the flow diameter can be opened and closed without a deformation of the valve body, as is the case for example with conventional umbrella valves. Thus, a deformation-induced deterioration is avoided.

In an advantageous embodiment, the valve housing comprises threaded means, in particular a thread, for being screwed into the mounting of the cylinder head cover. Other attachments are possible. Alternatively, it may be possible to fittingly insert the valve housing into the cylinder head cover enabling a particularly quick mounting.

Preferably, a latch means acting between the valve body and the valve housing is provided to prevent the valve from unintentionally getting detached during operation. Alternatively, a securing means may be provided on a component of the cylinder head cover, which, when the component is mounted, is located relative to the valve housing such that upon a detaching movement of the valve housing the same abuts against the securing means. In particular when the valve housing can be fittingly inserted into the mounting, alternatively a clamping connection can be provided between the valve housing and the mounting.

In another advantageous embodiment, the valve housing may be press-fit into the mounting of the oil separating module enabling a particularly quick mounting.

Preferably, an axial latch element acting between the valve body and the valve housing is provided to prevent the valve from unintentionally getting detached during operation. Alternatively, a securing element may be provided on a component of the oil separating module, which, when the component is mounted, is located relative to the valve housing such that upon a detaching movement of the valve housing the same abuts against the securing element. Preferably, a clamping element can be provided between the valve housing and the mounting, for establishing a clamping connection and seal between the valve housing and the mounting when the valve housing is fittingly inserted into the mounting.

The valve body preferably is ball-shaped or spherical. Compared to a valve body that at least in sections has a cylindrical shape, the installation height of the valve thus can be reduced, if necessary. Ball-shaped is to be taken generally and includes for example also ellipsoid-shaped or ovoid-shaped.

In the following, the invention will be described in detail on the basis of preferred embodiments with reference to the accompanying figures.

The cylinder head cover 10 shown in FIG. 1A in cross-sectional view comprises a housing 11 which for example is made of thermoplastic and can be connected to the cylinder head of a combustion engine via sealing elements 12. An only schematically shown oil separator 13, into which blow-by gases are fed from the crankcase of the combustion engine via a gas inlet, is located in an oil separator chamber 22 of the cylinder head cover 10. The cleaned gas via a gas outlet comes from the oil separator 13 into a cleanroom 21 in the cylinder head cover 10, and from there for example is fed into the intake section of the combustion engine. The separated oil can be accumulated in an accumulation chamber 14 and via an oil return 17 is fed back into the oil pan of the crankcase. The oil return 17 includes an oil discharge opening 15 in a housing part 18. In this embodiment, the oil separator chamber 22 during operation is closed by a lid 19. The lid 19 for example can be made of thermoplastic and can be welded to the housing 11. Other attachments, for example by use of screws, are possible. Oil separator chamber 22, oil accumulation chamber 14 and cleanroom 21, as shown in FIG. 1A, can be formed by a single closed functional chamber in the cylinder head cover 10, which in this embodiment is enclosed by the housing 11, housing parts 18, 23 and the lid 19.

A non-return valve 20, which is illustrated in more detail in FIGS. 2A, 3A, 4A, 5, 6A, and 7A, is arranged in the oil return 17. The non-return valve 20 preferably is located in the oil discharge opening 15 which thus forms a mounting for the non-return valve 20. It includes a valve housing 27 with a shaft 24, a head 25 located at one end of the shaft 24, and an end portion 26 located at the other end of the shaft 24. A screw thread 38 is provided on the outer surface of the shaft 24 (see FIG. 5), which interacts with a corresponding screw thread on the inner surface of the oil discharge opening 15.

The non-return valve 20 comprises an axial through bore 36 extending through the entire valve housing 27, i.e., from the valve head 25 through the shaft 24 up to the end portion 26. The non-return valve 20 further comprises a valve body 37 which can be displaced between an open position and a closed position, as will be described in more detail in the following. In the open position, the valve body 37 allows the discharge of oil from the oil separator chamber 22 or the oil accumulation chamber 14 through the non-return valve or the through bore 36 to the crankcase side 16 to finally arrive in the oil pan of the crankcase. In case of an overpressure at the crankcase side 16 of the non-return valve 20 relative to the separator chamber 22, the valve body 37 is moved to the closed position to prevent an unintentional transport of oil from the crankcase into the cleanroom 21 through the oil discharge opening 15 against the oil discharge direction.

For being mounted the non-return valve 20 is screwed into the oil discharge opening or mounting 15 from above, i.e. from the side of the oil separator 13', until the head 25 abuts against the housing part 18 forming the mounting 15. For this purpose, a tool-receiving socket 34 for receiving a tool, for example a hex key, can be provided in the valve head 25.

The sealing between the valve housing 27 and the housing part 18 forming the mounting 15 here is effected by use of a sealing ring 28 which for example is located on the valve head 25, whereas it is also possible to locate the same in the area of the shaft 24. The sealing between the valve housing 27 and the housing part 18 can alternatively also be realized by a gap-free seat of the valve housing 27 or the valve head 25 on the housing part 18. In this case, a separate sealing element can be omitted.

A latch means 29 is provided on the valve head 25, preferably on its circumferential surface. The latch means 29 here includes two latch fingers 30 which are mounted in an elastically resilient manner on the valve head 25 via a web 31. When the valve housing 27 is screwed into the mounting 15, the latch fingers 30 get in contact with a circumferential wall is of the mounting 15 and are pressed towards the valve head 25 into corresponding recesses 32 between the latch fingers 30 and the valve head 25. On the circumferential wall of the mounting 15, a notched structure 33 with notch recesses 35 (see FIG. 4A) distributed over the circumference is preferably provided. When the valve housing 27 is inserted into the mounting 15 completely, the latch fingers 30 engage into corresponding notch recesses 35, see FIG. 4A, whereas rattling forces occurring during operation do not suffice to disengage the latch fingers 30 from the notch recesses 35 against the resilient force. The non-return valve 10 thus is reliably mounted in the mounting 15 by the latch means 29, 33, 35.

By applying a detaching force in the detaching direction, for example by use of a tool inserted into the tool-receiving socket 34, the valve housing 27 can be unscrewed from the mounting 15, whereby the latching force between the latch means 29, 33, 35 is overcome. The valve housing 27 thus advantageously is detachably latched or mounted in the mounting 15. Embodiments in which the valve housing 27 is non-detachably latched or mounted in the mounting 15, for example by use of a snap-in latch means acting in the circumferential direction, are also possible.

At its end portion 26, the valve housing comprises a plurality of axial bars 39 spaced from one another between which the valve body is mounted so as to be axially displaceable. The bars 39 thus form an axial guidance for the valve body 37. In the mounted state of the valve 20, the end portion 26 of the valve 20 and the bars 39 advantageously may protrude completely beyond the housing part 18 and then extend freely into the crankcase side chamber 16, as can be best identified in FIG. 2A. However, this is not mandatory at all. In other embodiments, the end portion 26 does not protrude as described above to advantageously be protected against external manipulations, for example during the assembly, or against splash oil.

At their free ends, the bars 39 comprise inward-bent extensions 40 forming a seat 41 for the valve body 37 in the non-operating state of the engine. In the non-operating state of the engine, the valve body 37 being subject to gravity rests on the extensions 40 or the valve seat 41 and uncovers a maximum flow diameter for the discharging oil through the openings 42 between the bars 39. Thus, it is secured that the oil accumulated in the oil separator chamber 22 or the oil accumulation chamber 14 essentially can discharge completely in the non-operating state of the engine, whereby the risk of the valve 20 to freeze can be reduced significantly.

If the pressure at the crankcase side 16 of the valve 20 exceeds the pressure in the oil separator chamber 22 to such an extent that the compressive force acting on the valve body 37 exceeds its weight force, the valve body 37 is lifted by the compressive force and is displaced axially, until the valve body 37 rests against an upper ring-shaped valve seat 43 (see FIG. 2A), which advantageously is formed in the shaft 24. The valve seat 43 for example can be formed by an upward-tapering cone-shaped inner surface of the shaft 24. The through opening enclosed by the upper valve seat 43 is part of the through bore 36.

In the closed position, in which the valve body 37 rests against the upper valve seat 43, the through bore 36 is covered by the valve body 37 and the ingress of oil-loaded gas from the crankcase into the oil separator chamber 22 or the cleanroom 21 is prevented.

The valve 20 features exactly two positions of the valve body 37 which in particular are defined by abutments, i.e. the open position with maximum oil flow diameter and the closed position. At any constant relative pressure between the crankcase side 16 and the oil separator chamber 22, the valve body 37 can take the open position or the closed position only, but no other position. If there is no difference in pressure, the valve body 37 is in the open position.

According to the above, the oil discharge valve 20 is operated by gravity and difference in pressure between the crankcase side 16 and the oil separator chamber 22 only, i.e. without external power. The valve 20 thus advantageously is uncontrolled, non-magnetic and non-electric. The valve also is not a float valve, as the fluid level in the oil accumulation chamber 14 does not have any effect on the valve body 37.

Other connections than the connection between the valve housing 27 and the mounting 15 are possible. For example in the embodiment according to FIG. 6A, the valve housing 27 can be fittingly inserted into the mounting 15 of the housing 11. The shaft 24 here does not comprise a screw thread 38, however advantageously one or more clamping elements 44, here two axially spaced clamping rings which may be integrally-formed to the outer circumference of the shaft and may have a slight oversize with respect to the mounting 15. The clamping element 44 advantageously may comprise an elastomer coating or may be made of an elastomer with which flexibility during insertion as well as a sealing effect can be realized.

To prevent the valve 20 from moving out of the mounting 15 for example being subject to vibrations, an axially acting latch means, for example a snap-in latch means, can be provided between the valve housing 27 and the mounting 15. Alternatively, a component 45 of the cylinder head cover 10 can comprise a securing means 47 which during operation is located above the valve head 25 at a small distance (see FIG. 7A) so that the valve housing 27 in the event of moving out of the mounting 15 abuts against the securing means 47. The component 45 is mounted after the insertion of the valve 20 into the mounting 15. In the embodiment according to FIG. 1A, a pin, a shoulder or a similar securing means can be provided for example on the rear side of the lid 19, which after the mounting of the lid 19 is located at a small distance from the upper surface of the valve head 25. The component 45 bearing the securing means 47 is not limited to the housing lid 19 or other housing parts. It may for example also be a part of the oil separator 13 or an oil carrying device (see FIG. 7A).

Figure 1B:
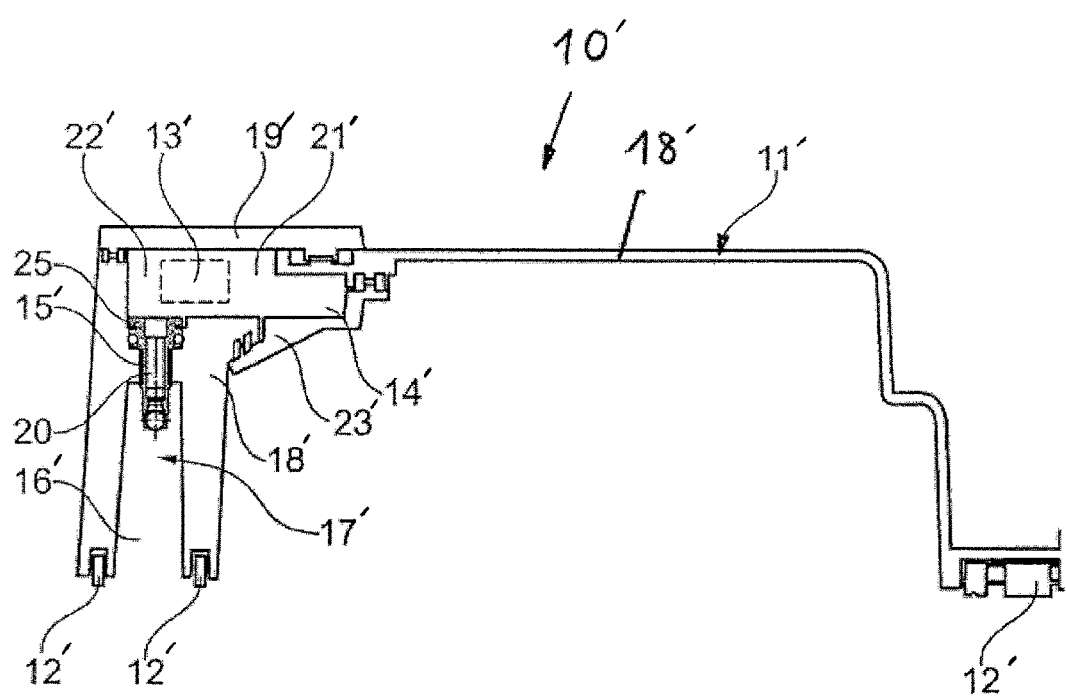
FIG. 1B shows a cross-sectional view through an oil separating module.
Figure 2A:
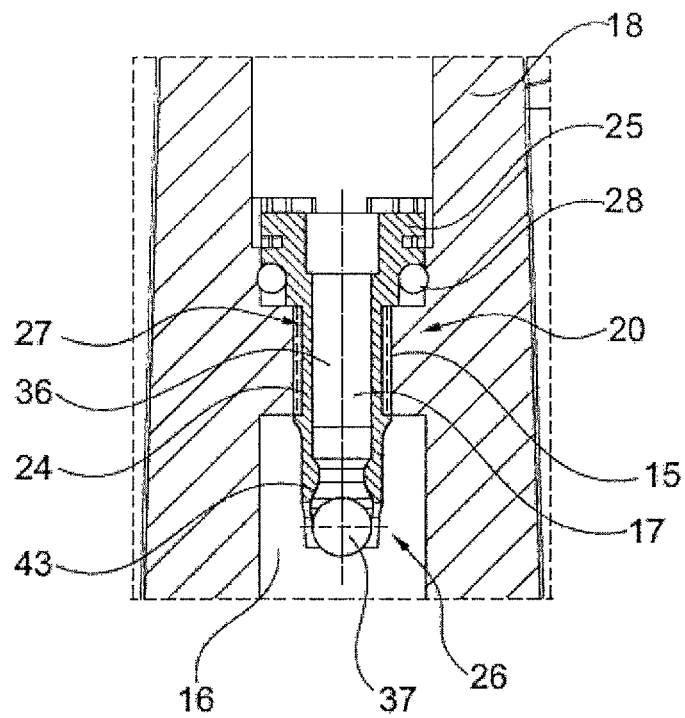
FIG. 2A shows a cross-sectional view through a non-return valve inserted into a cylinder head cover.
Figure 3A:
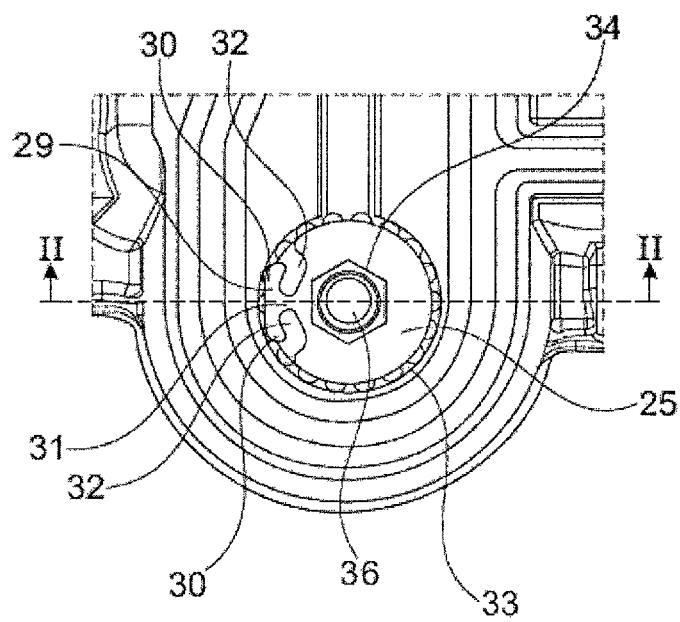
FIG. 3A shows a top view of the non-return valve from FIG. 2A.
Figure 2B:
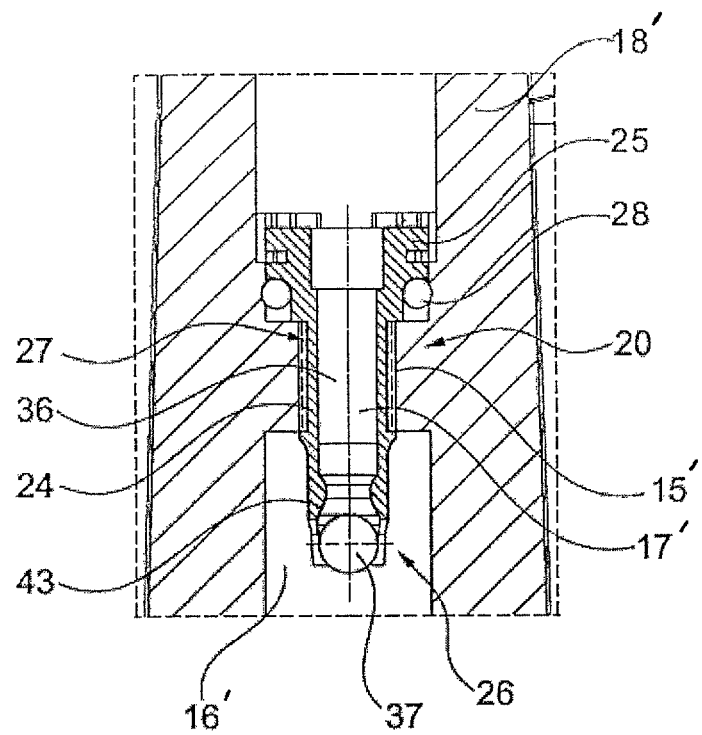
FIG. 2B shows a cross-sectional view through a non-return valve inserted into an oil separating module.
Figure 3B:
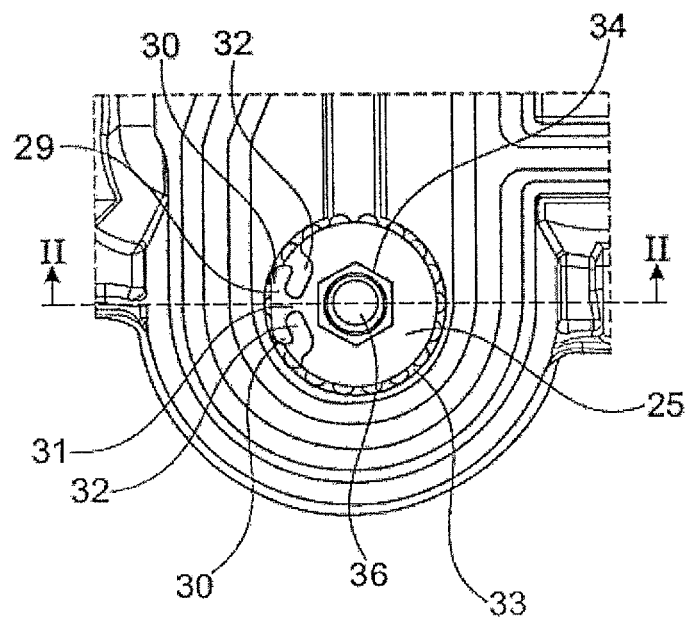
FIG. 3B shows a top view of the non-return valve from FIG. 2B.
Figure 4A:
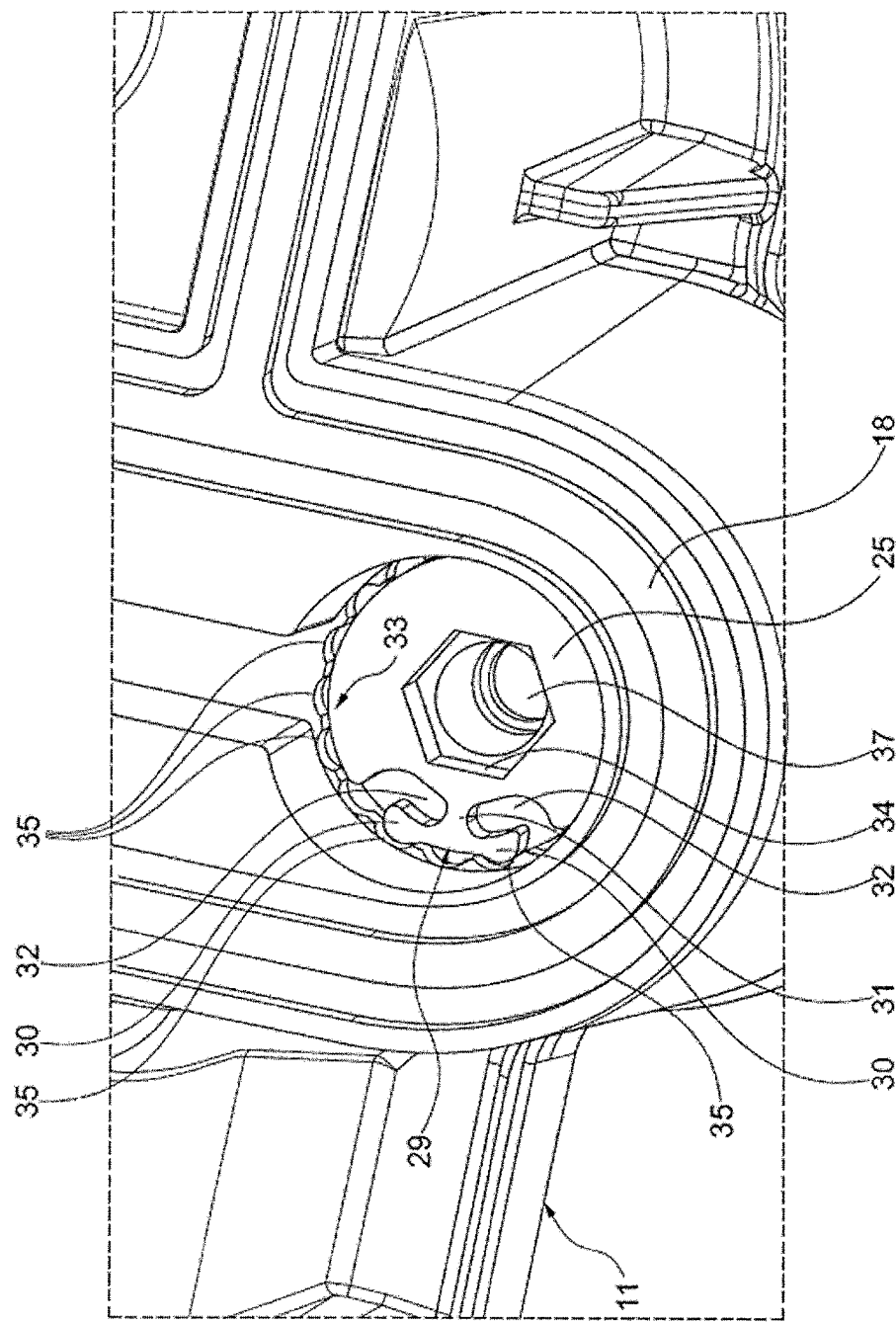
FIG. 4A shows a perspective top view of a non-return valve inserted into a cylinder head cover.
Figure 4B:
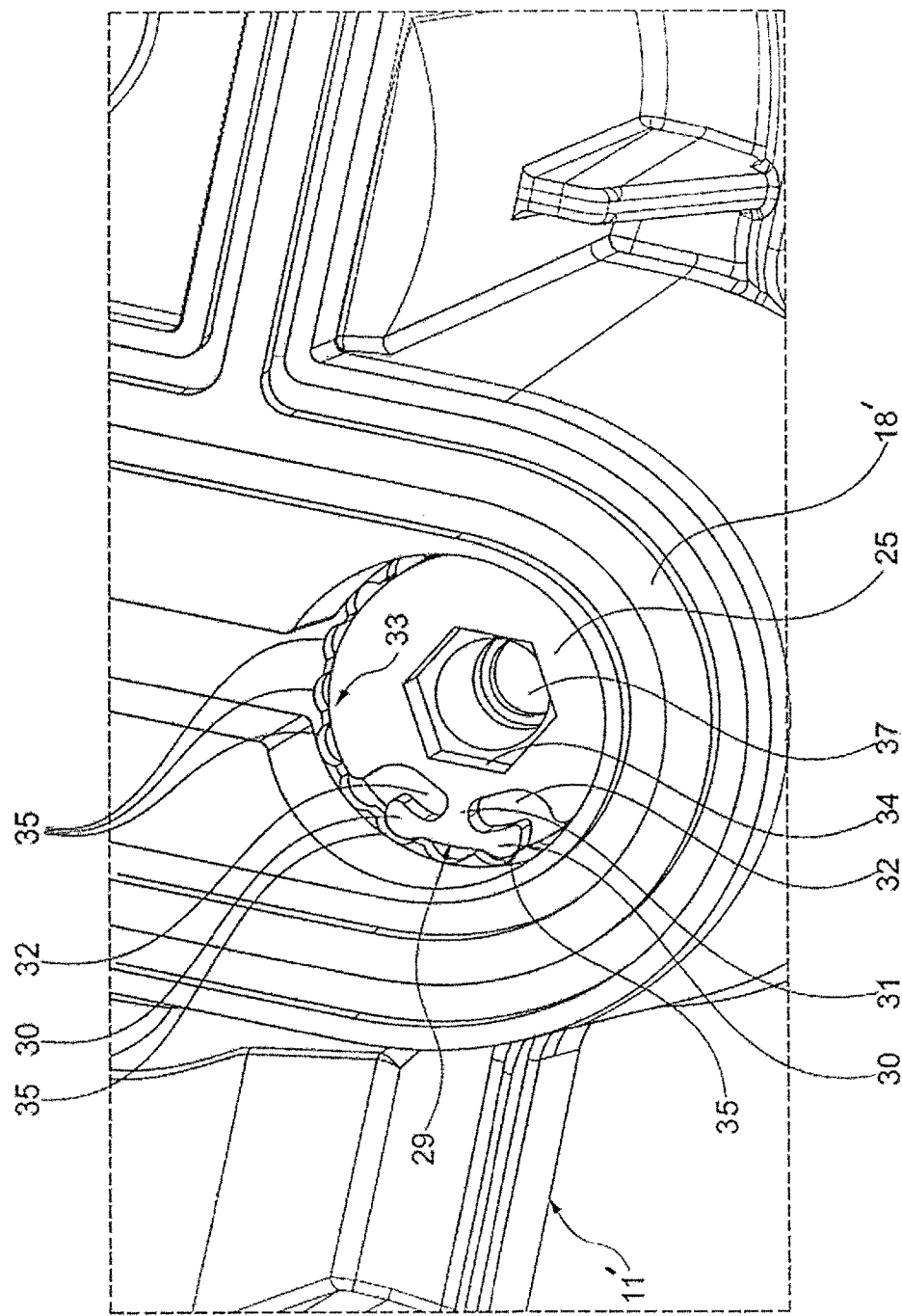
FIG. 4B shows a perspective top view of a non-return valve inserted into an oil separating module.

FIG. 1B shows an embodiment of an oil separating module 10' in cross-sectional view, which may be a cylinder head cover or a separate module. Elements in FIG. 1B in common with elements in FIG. 1A are shown using the same reference numeral with a prime, indicating that although the elements can be the same as the common element in FIG. 1A, such elements can also have differences with respect to the common elements in FIG. 1A. The oil separator module 10' comprises a housing 11' composed of one or more housing parts 18', 19', 23' and made for example on the basis of a thermoplastic, including a reinforced thermoplastic. The oil separating module 10' can be connected to a motor housing part, like the cylinder head, a so-called closed cam carrier, or a motor cover, of the internal combustion engine via one or more sealing elements 12' sealing the oil return 17' and/or one or more sealing elements 50, like a sealing ring, sealing the gas inlet 49. see FIG. 9. An oil separator 13', into which blow-by gases are fed from the crankcase of the combustion engine via a gas inlet 49, is located in an oil separator chamber 22' of the oil separating module 10'. The cleaned gas via a gas outlet flows from the oil separator 13' into a cleanroom 21' in the oil separating module 10', and from there for example is fed into the air intake section of the combustion engine. The separated oil can be accumulated in an accumulation chamber 14' and via an oil return 17' is fed back into the oil sump or oil pan of the crankcase. The oil return 17' includes an oil discharge opening 15' in a housing part 18' of the oil separating module 10'. In this embodiment, the oil separator chamber 22' during operation is closed by a lid 19'. The lid 19' for example can be made of thermoplastic and can be welded to the housing 11'. Other materials and attachments, for example by use of screws, are possible. Oil separator chamber 22', oil accumulation chamber 14' and cleanroom 21', as shown in FIG. 1B, can be formed in the oil separating module 10' by a single closed functional chamber, which in this embodiment is enclosed by the housing 11', namely the housing parts 18', 23' and the lid 19'.

A non-return valve 20, which is illustrated in more detail in FIGS. 2B, 3B, 4B, 5, 6B, 7B, 8 and 9, is arranged in the oil return 17'. Elements in FIGS. 2B, 3B, 4B, 5, 6B, 7B, 8 and 9 in common with elements in FIGS. 2A, 3A, 4A, 5, 6A, and 7A are shown using the same reference numeral with a prime, indicating that although the elements can be the same as the common element in FIGS. 2A, 3A, 4A, 5, 6A, and 7A, such elements can also have differences with respect to the common elements in FIGS. 2A, 3A, 4A, 5, 6A, and 7A. The non-return valve 20 preferably is located in the oil discharge opening 15' which thus forms a mounting for the non-return valve 20. The mounting 15' may preferably have the form of a cylindrical bore in a housing part 18' of housing 11' of the oil separating module 10'. The non-return valve 20 includes a valve housing 27 with a shaft 24, a head 25 located at one end of the shaft 24, and an end portion 26 located at the other end of the shaft 24. One or more clamping ribs 44' are provided on the outer surface of the shaft 24, which interacts with the inner surface of the oil discharge opening 15' in a sealing and valve retaining manner, as will be described later.

The non-return valve 20 comprises an axial through bore 36 (see FIGS. 7B and 9) extending through the entire valve housing 27, i.e., from the valve head 25 through the shaft 24 up to the end portion 26. The non-return valve 20 further comprises a valve body 37 which can be displaced between an open position and a closed position, as will be described in more detail in the following. In the open position, the valve body 37 allows the discharge of oil from the oil separator chamber 22' or the oil accumulation chamber 14' through the non-return valve 20 or the through bore 36 to leave the oil separating module 10' on the crankcase side 16' and further to the oil sump of the combustion engine. In case of an overpressure at the crankcase side 16' of the non-return valve 20 relative to the separator chamber 22', the valve body 37 is moved to the closed position to prevent an unintentional transport of oil from the crankcase or oil sump into the cleanroom 21' through the oil discharge opening 15' against the oil discharge direction.

At its end portion 26, the valve housing comprises a plurality of axial bars 39 spaced from one another between which the valve body is mounted so as to be axially displaceable. The bars 39 thus form an axial guidance for the valve body 37. At their free ends, each bar 39 comprises an inward-bent extension 40. The inward-bent extensions 40 form a seat 41 for the valve body 37 in the non-operating state of the engine. In this non-operating state, the valve body 37 being subject to gravity rests on the extensions 40 or the valve seat 41 and uncovers a maximum flow cross-section for the discharging oil through the openings 42 between the bars 39. Thus, it is secured that the oil accumulated in the oil separator chamber 22' or the oil accumulation chamber 14' essentially can discharge completely in the non-operating state of the engine, whereby the risk of the valve 20 to freeze can be reduced significantly.

If the pressure at the crankcase side 16' of the valve 20 exceeds the pressure in the oil separator chamber 22' to such an extent that the pressure acting on the valve body 37 exceeds its weight, the valve body 37 is lifted by the pressure and is displaced axially, until the valve body 37 rests against an upper ring-shaped valve seat 43 (see FIG. 7B), which advantageously is formed in the shaft 24. The valve seat 43 for example can be formed by an upward-tapering cone-shaped inner surface of the shaft 24. The through opening enclosed by the upper valve seat 43 is part of the through bore 36.

In the closed position, in which the valve body 37 rests against the upper valve seat 43, the through bore 36 is closed by the valve body 37 and the ingress of oil-loaded gas from the crankcase into the oil separator chamber 22' or the cleanroom 21' is prevented. Also, the re-entering of already separated oil, rising in the oil return 17', into the oil separator chamber 22' or the cleanroom 21' is prevented, which is particularly relevant in case the oil return 17' terminates under the oil level of the oil sump, for example if it leads to an oil return channel in the cylinder head.

The valve 20 features exactly two stable positions of the valve body 37, which in particular are defined by abutments of the valve body 37, namely the open position with maximum oil flow cross-section and the closed position. At any constant relative pressure between the crankcase side 16' and the oil separator chamber 22', the valve body 37 can take the open position or the closed position only, but no intermediate position. If there is no difference in pressure, the valve body 37 is in the open position.

According to the above, the oil discharge valve 20 is operated by gravity and difference in pressure between the crankcase side 16' and the oil separator chamber 22' only, i.e. without external power. The valve 20 thus advantageously is uncontrolled, non-magnetic and non-electric. The valve also is not a float valve, as the fluid level in the oil accumulation chamber 14' does not have any effect on the valve body 37 (unless oil rising in the oil return 17' is able to create a hydrostatic pressure which is larger than the above mentioned difference in gas pressure).

Figure 6A:
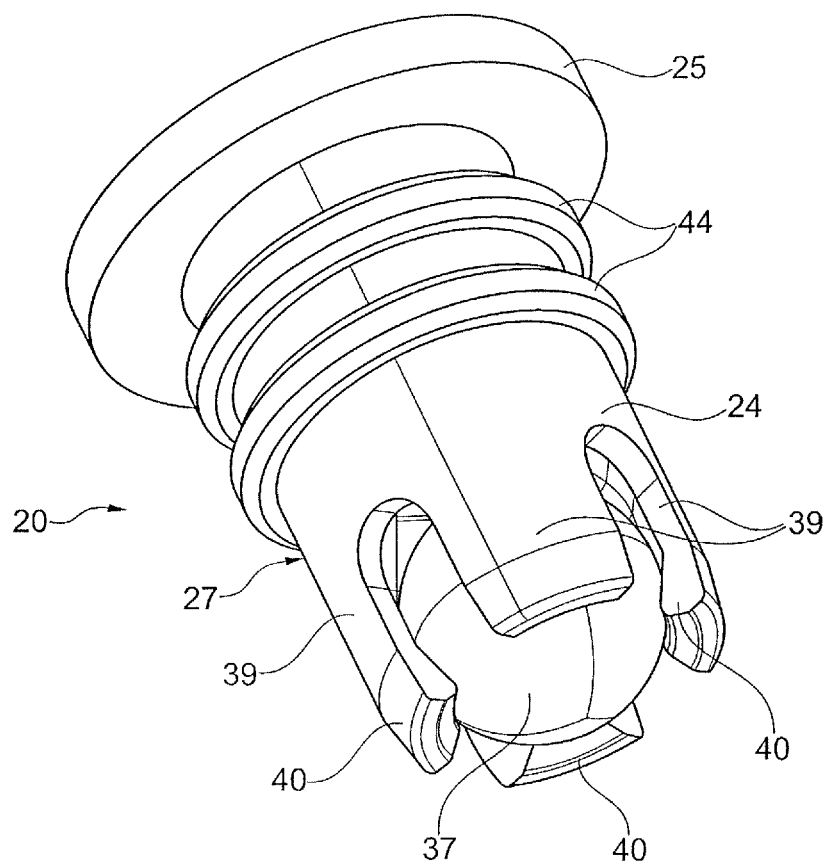
FIG. 6A shows a perspective view of another embodiment of a non-return valve.
Figure 6B:
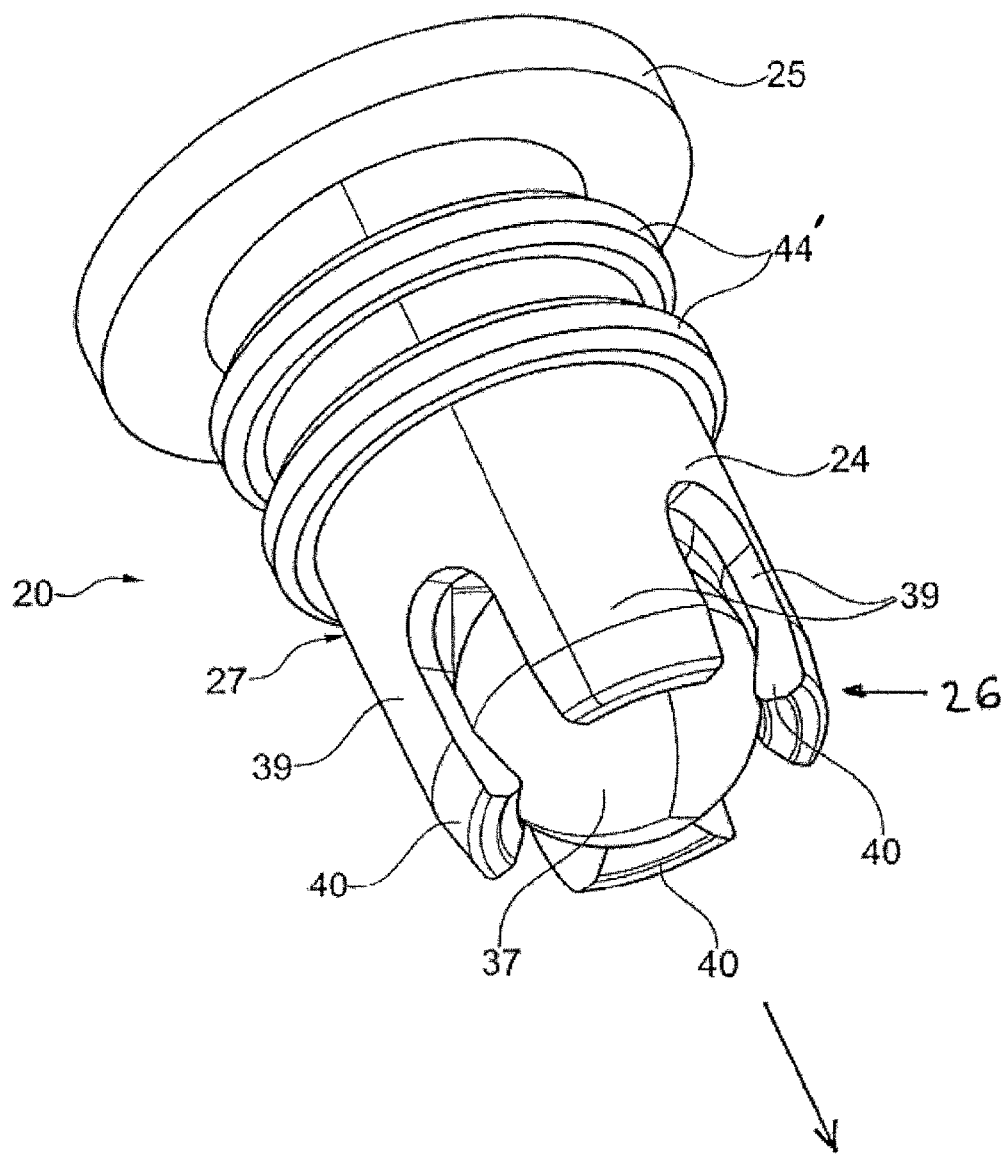
FIG. 6B shows a perspective view of another embodiment of a non-return valve.
Figure 7A:
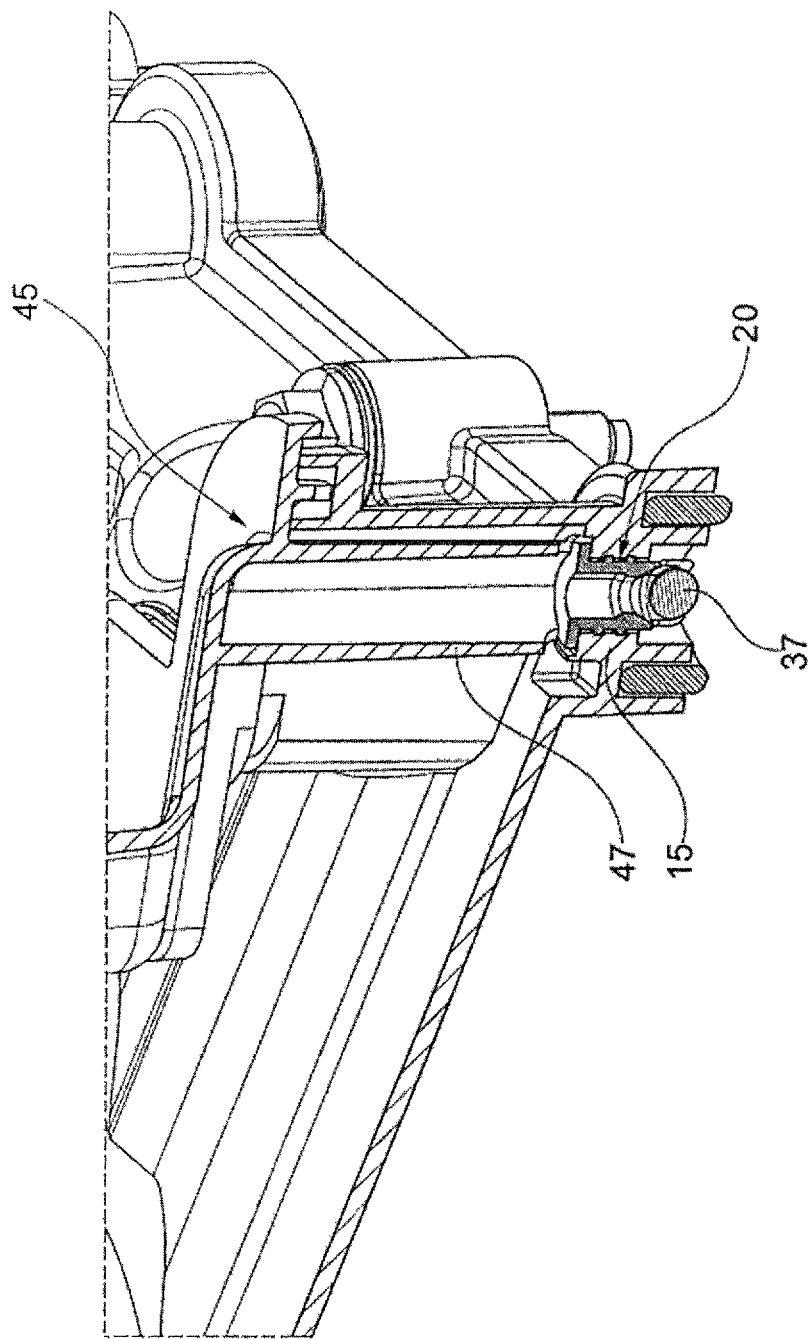
FIG. 7A shows a perspective view of a cylinder head cover with an inserted non-return valve according to FIG. 6A.
Figure 7B:
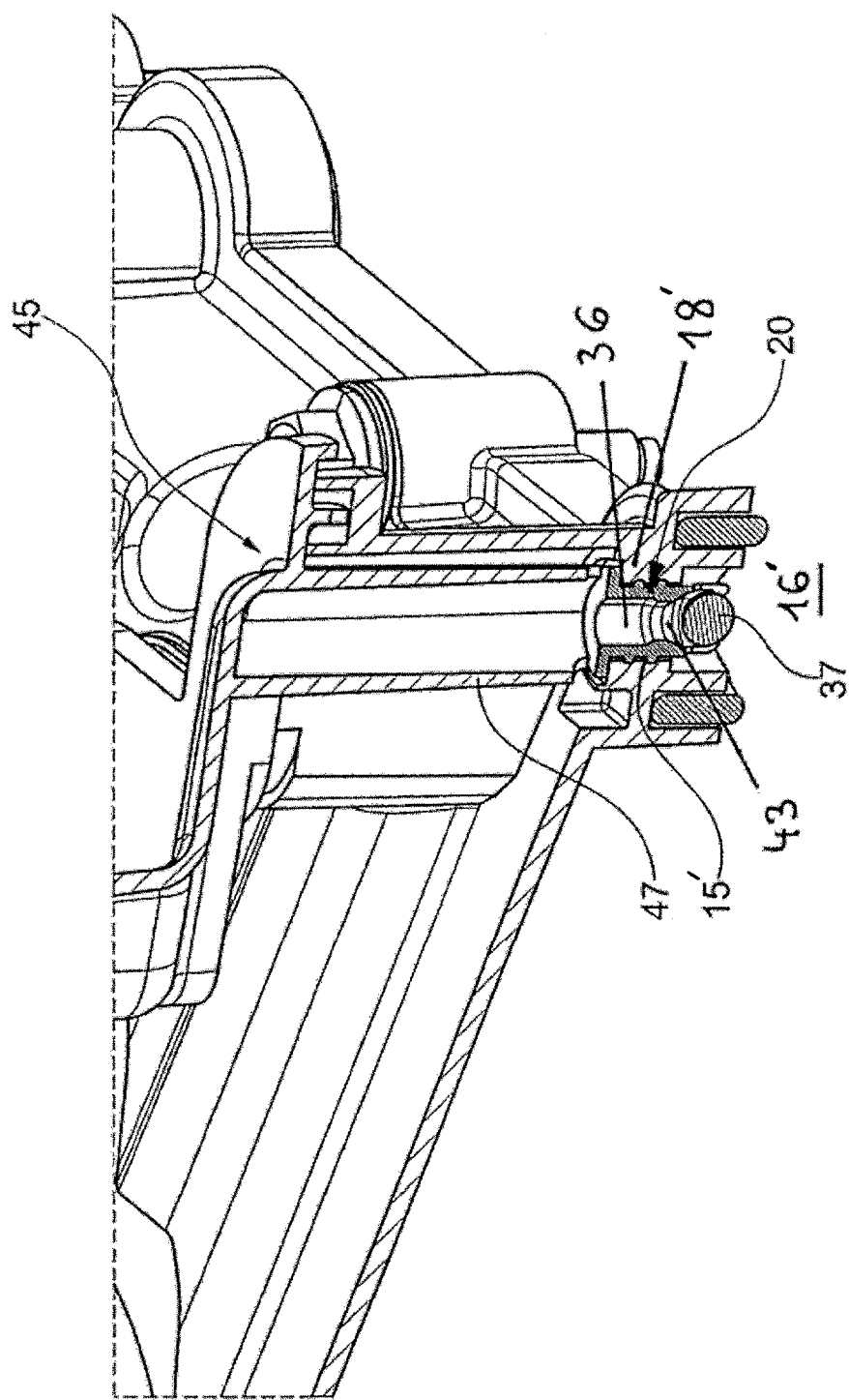
FIG. 7B shows a perspective view of an oil separating module with an inserted non-return valve according to FIG. 6B.

The valve housing 27 comprises at least one, preferably a plurality of, more preferably two circumferential clamping rings or ribs 44' which are axially spaced from each other. In the embodiment of FIGS. 6B and 7B, the clamping ribs 44' protrude from the outer cylindrical surface of the shaft 24.

Figure 8:
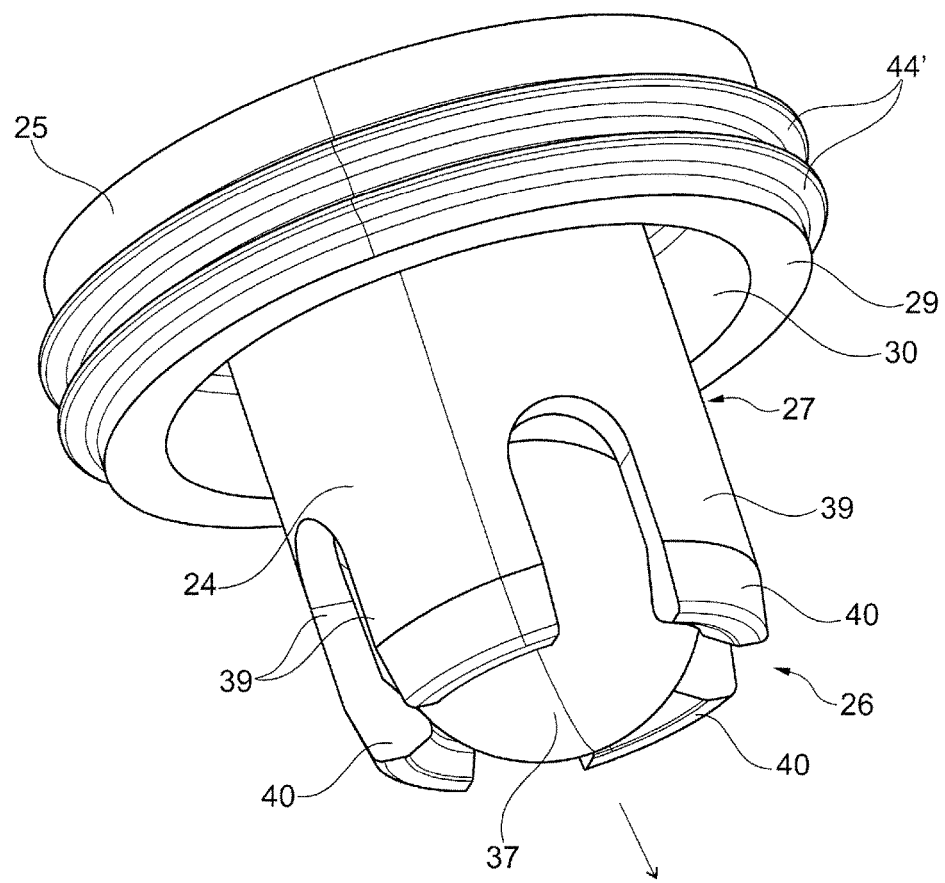
FIG. 8 shows a perspective view of another embodiment of a non-return valve.
Figure 9:
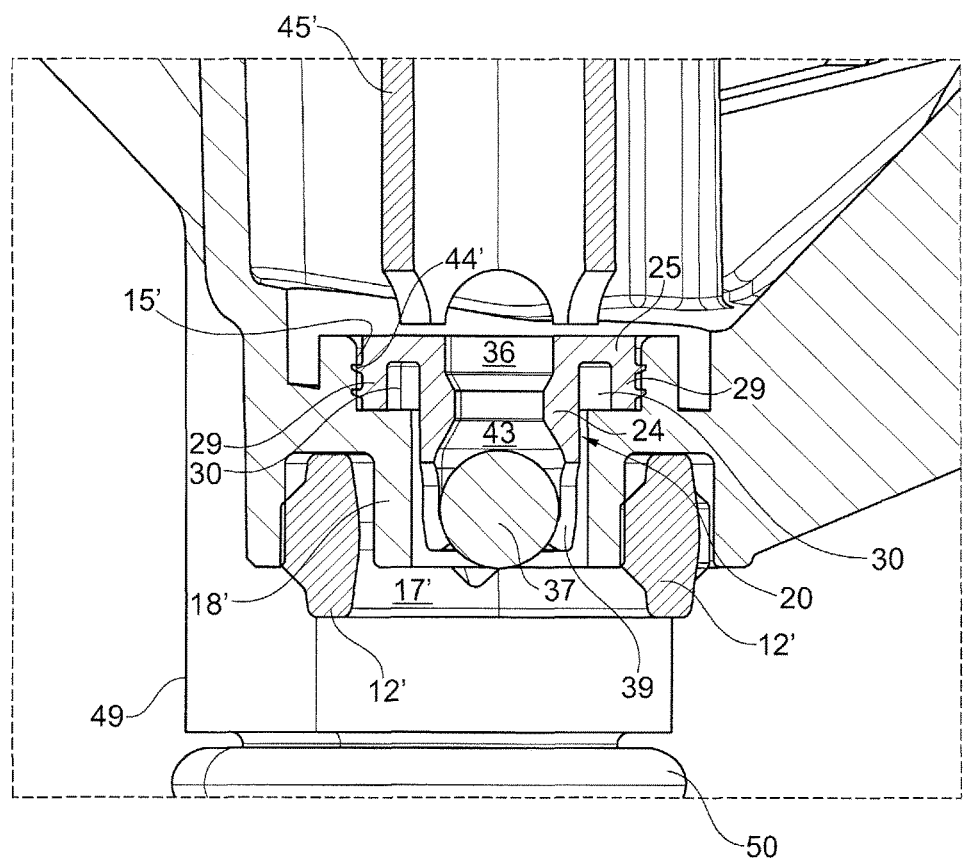
FIG. 9 shows a perspective view of an oil separating module with an inserted non-return valve according to FIG. 8.

In the preferred embodiment of FIGS. 8 and 9, the clamping ribs 44' protrude from the outer cylindrical surface of the head 25. More precisely, the head 25 comprises a cylindrical collar 29 which extends parallel to the shaft 24 with a radial distance such that a cylindrical ring gap 30 is formed between the collar 29 and the shaft 24.

The clamping ribs 44' advantageously have a slight oversize with respect to the mounting 15', as can be seen best in FIG. 9. Due to the oversize of the clamping ribs 44', the valve 20 can be press-fit into the mounting 15'. In the mounted state, the clamping ribs 44' exert a retaining force on the valve housing, such that a movement of the valve housing out of the mounting 15' is counteracted. Furthermore, in the mounted state, the clamping ribs 44' provide sealing of the gap between the valve housing 27 and the mounting 15' against oil. Therefore, the clamping ribs 44' also form sealing ribs.

Due to the arrangement of the sealing ribs 44' at the outer surface of the collar 29, and the cylindrical ring gap 30 formed between the collar 29 and the shaft 24, the collar 29 can significantly deform under the influence of the walls of the mounting 15' during the insertion of the valve housing 27, for example caused by the walls of the mounting 15' being not exactly cylindrical. The collar 29 can fully absorb such deformations through movement into the gap 30, and therefore essentially no deformations are caused in the region of the valve seat 43. This contributes to excellent valve closure in the closed state, even in case of large tolerances, like eccentricities or ovalities, of the bore forming the valve mounting 15'. In other words, the collar 29 carrying the ribs 44' and the shaft 24 forming the valve seat 43 are mechanically decoupled from each other.

In this manner, a relatively small non-return valve 20 may advantageously be arranged in an oil separating module made of a suitable material.

The clamping rings 44' and the shaft 24 or the head 25, respectively, are preferably formed integrally as one piece. More preferably, the complete valve housing 27 is formed integrally as one piece, such that the valve 20 is composed of two parts, only, namely the valve housing 27 and the valve body 37. The valve housing 27 is preferably made on the basis of an isotropic polymer material, for example of a polymer material re-enforced by glass spheres. The clamping rings 44' preferably being made of the same material provide sufficient sealing in the present application of the non-return valve 20. The housing parts 18', 19', 23' may be made of a different polymer material, preferably a material providing higher strength than the material of the valve 20, in particular a fibre re-enforced thermoplastic material, like glass fiber re-enforced thermoplastics.

For being mounted the non-return valve 20 is pushed or press-fit by an axial movement into the mounting 15' from the side of the oil separator 13', i.e., in the direction of the arrows in FIGS. 6B and 8, for example until the head 25 abuts against the housing part 18' forming the mounting 15'. The simple push mounting of the non-return valve 20 can be done significantly faster than the screwing-in of the non-return valve 20 known in the art.

The sealing between the valve housing 27 and the housing part 18' can alternatively also be realized by an elastomer sealing ring.

To prevent the valve 20 from moving out of the mounting 15' for example being subject to vibrations, a component 45' of the oil separating module 10', in particular a housing part, can comprise a securing element 47 which during operation is located above the valve head 25 at a small or zero distance (see FIGS. 7B and 9) so that the valve housing 27 in the event of experiencing a force tending to move it out of the mounting 15' abuts against the securing element 47'. The component 45' is mounted after the insertion of the valve 20 into the mounting 15'. In the embodiment according to FIG. 1B, a pin, a shoulder or a similar securing element can be provided for example on the rear side of the lid 19', which after the mounting of the lid 19' is located at a small distance from the upper surface of the valve head 25. The component 45' bearing the securing element 47' is not limited to the housing lid 19' or other housing parts. It may for example also be a part of the oil separator 13' or an oil guiding device or pipe (see FIGS. 7B and 9).

In an embodiment not shown in the Figures, instead of a securing element 47 acting on the head 25 of the valve housing 27, an axially acting latch element acting between the valve housing 27 and the mounting 15', for example a snap-in latch element, can be provided at the valve housing 27 or at the mounting 15'. The latch element automatically latches into a corresponding latch opening upon axial movement of the valve 20 into the mounting 15', without any further action having to be taken. In other words, a snap-fit connection is established between the valve housing 25 and the mounting 15'.

Figure 5:
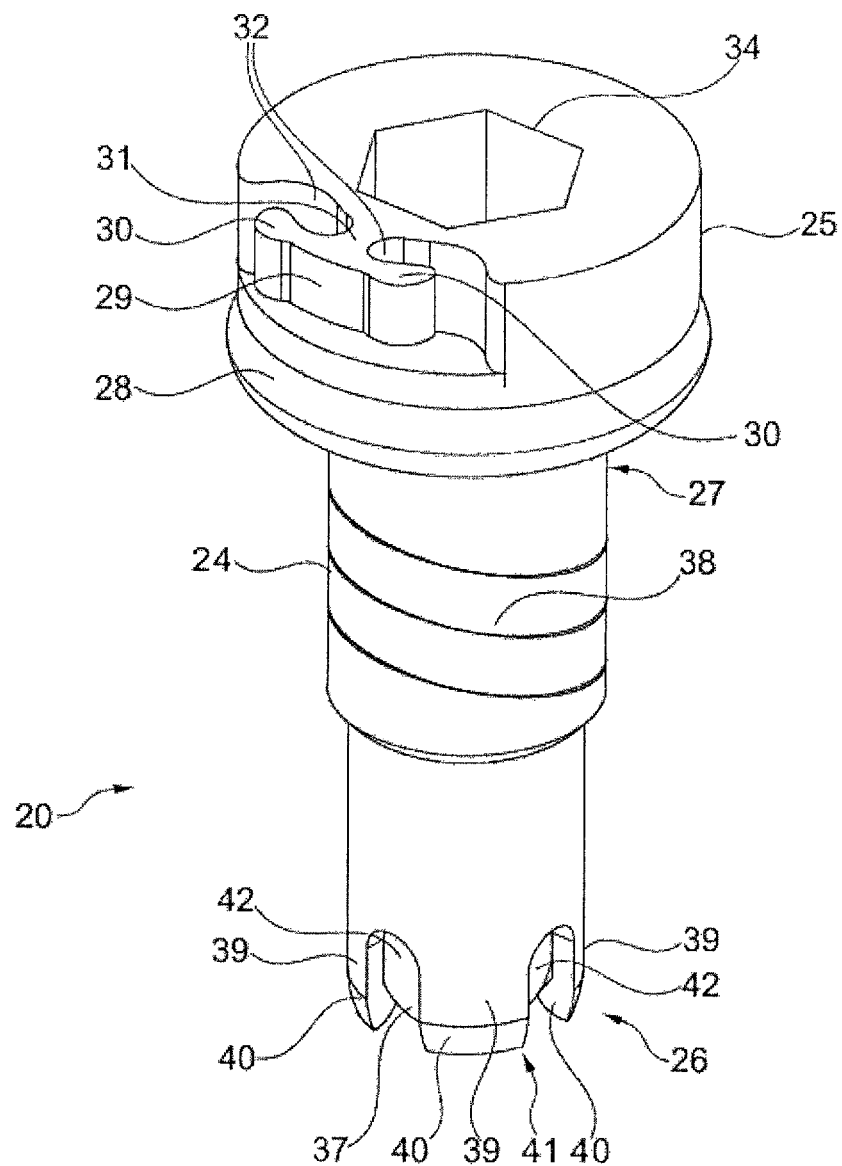
FIG. 5 shows a perspective view of a non-return valve.

The embodiment of the non-return valve shown in FIG. 5 can be utilized in conjunction with the oil separating module 10' shown in FIG. 1B, in the same manner as the embodiment of the non-return valve shown in FIG. 5 is utilized in conjunction with the cylinder head cover 10 shown in FIG. 1A, and described with respect to FIGS. 1A, 2A, 3A, 4A, and 5, with respect to FIGS. 1B, 2B, 3B, 4B, and 5, respectively.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An oil separating module for a combustion engine, comprising:
   an oil separator;

an oil return which is arranged such that separated oil can flow through the oil return to an oil sump;
a mounting;
a non-return valve,
wherein the non-return valve comprises:
a valve housing,
wherein the valve housing has a throughbore having a first end opening and a second end opening; and
a valve body,
wherein the valve body is movably mounted in the valve housing such that the valve body transitions between an open position and a closed position,
wherein in the open position, fluids are able to pass from the first end opening to the second end opening and fluids are able to pass from the second end opening to the first end opening,
wherein in the closed position, fluids are not able to pass from the first end opening to the second end opening and fluids are not able to pass from the second end opening to the first end opening,
wherein the valve housing and the valve body are configured such that when the valve housing is positioned such that the first end opening is above the second end opening with respect to gravity:
(i) the valve body automatically transitions to, or remains in, the closed position when a second pressure at the second end opening is greater than a first pressure at the first end opening by at least a threshold pressure difference; and
(ii) the valve body automatically transitions to, or remains in, the open position when the second pressure is not greater than the first pressure by at least the threshold pressure difference,
wherein the non-return valve is insertable into the mounting such that when the non-return valve is inserted into the mounting separated oil enters the first end opening,
wherein when the valve body is in the open position the separated oil that enters the first end opening passes from the first end opening to the second end opening to return to the oil sump,
wherein the non-return valve is configured to be push-fitted into the mounting by movement of the non-return valve along a longitudinal axis of the mounting,
wherein the valve housing comprises at least two clamping elements arranged around an outer circumference of the valve housing,
wherein the at least two clamping elements are arranged with an axial distance to each other,
wherein the at least two clamping elements and the valve housing are formed integrally as one part,
wherein the at least two clamping elements are positioned at a head of the valve housing,
wherein the head of the valve housing comprises a cylindrical collar,
wherein the at least one clamping element is positioned at said cylindrical collar,
wherein a cylindrical ring gap is formed between said cylindrical collar and a shaft of said non-return valve,
wherein the cylindrical collar extends parallel to the shaft with a radial distance such that the cylindrical ring gap is formed between the cylindrical collar and the shaft of said non-return valve,
wherein each clamping element of the at least one clamping element is ring shaped and protrudes from an outer cylindrical surface of the head of the valve housing,
wherein the cylindrical collar can absorb deformations through movement into the cylindrical ring gap, and
a securing element,
wherein when the non-return valve is inserted into the mounting, the securing element is located relative to the valve housing such that upon a movement of the valve housing tending to separate the valve housing from the mounting, the valve housing abuts against the securing element and prevents the valve housing from separating from the mounting.

2. The oil separating module according to claim 1, wherein the at least two clamping elements has a fitting size that is oversized with respect to the mounting.

3. The oil separating module according to claim 1, wherein the valve housing comprises a plurality of axial bars proximate the second end opening,
wherein the plurality of axial bars are spaced from one another, and
wherein when the valve body is in the open position at least a portion of the valve body is positioned between the plurality of axial bars.

4. The oil separating module according to claim 3, wherein the plurality of axial bars form a seat for the valve body when the valve body is in the open position.

5. The oil separating module according to claim 1, further comprising:
a housing,
wherein the housing comprises an opening, and
wherein the non-return valve is configured to be inserted through the opening and into the mounting.

6. The oil separating module according to claim 5, further comprising:
a lid,
wherein the lid is configured to close the opening.

7. The oil separating module according to claim 1,
wherein the second end opening opens to a crankcase of the combustion engine, and
wherein the non-return valve prevents oil from returning to the oil separator.

8. The oil separating module according to claim 1,
wherein the oil separating module is a cylinder head cover of an internal combustion engine.

9. The oil separating module according to claim 1,
wherein the oil separating module is adapted to be inserted into, or connected to, a motor housing part of an internal combustion engine in a sealing manner.

10. The oil separating module according to claim 1, wherein the valve body is spherical.

11. A method of returning separated oil for a combustion engine, comprising:
positioning a non-return valve such that the non-return valve receives separated oil from an oil separator of a combustion engine,
wherein the combustion engine comprises:
an oil separator;
an oil return which is arranged such that separated oil can flow through the oil return to an oil sump;
a mounting,
wherein the non-return valve comprises:
a valve housing,
wherein the valve housing has a throughbore having a first end opening and a second end opening; and
a valve body,
wherein the valve body is movably mounted in the valve housing such that the valve body transitions between an open position and a closed position,
wherein in the open position, fluids are able to pass from the first end opening to the second end opening and fluids are able to pass from the second end opening to the first end opening, wherein in the closed position, fluids are not able to pass from the first end opening to the second end opening and fluids are not able to pass from the second end opening to the first end opening, wherein the valve housing and the valve body are configured such that when the valve housing is positioned such that the first end opening is above the second end opening with respect to gravity:
  (i) the valve body automatically transitions to, or remains in, the closed position when a second pressure at the second end opening is greater than a first pressure at the first end opening by at least a threshold pressure difference; and
  (ii) the valve body automatically transitions to, or remains in, the open position when the second pressure is not greater than the first pressure by at least the threshold pressure difference, wherein the non-return valve is insertable into the mounting such that when the non-return valve is inserted into the mounting separated oil enters the first end opening, wherein when the valve body is in the open position the separated oil that enters the first end opening passes from the first end opening to the second end opening to return to the oil sump, and wherein the non-return valve is configured to be push-fitted into the mounting by movement of the non-return valve along a longitudinal axis of the mounting, wherein the valve housing comprises at least two clamping elements arranged around an outer circumference of the valve housing, wherein the at least two clamping elements are arranged with an axial distance to each other, wherein the at least two clamping elements and the valve housing are formed integrally as one part, wherein the at least one clamping element is positioned at a head of the valve housing, wherein the head of the valve housing comprises a cylindrical collar, wherein the at least one clamping element is positioned at said cylindrical collar, wherein a cylindrical ring gap is formed between said cylindrical collar and a shaft of said non-return valve, wherein the cylindrical collar extends parallel to the shaft with a radial distance such that the cylindrical ring gap is formed between the cylindrical collar and the shaft of said non-return valve, wherein each clamping element of the at least one clamping element is ring shaped and protrudes from an outer cylindrical surface of the head of the valve housing, and wherein the cylindrical collar can absorb deformations through movement into the cylindrical ring gap, and a securing element, wherein when the non-return valve is inserted into the mounting, the securing element is located relative to the valve housing such that upon a movement of the valve housing tending to separate the valve housing from the mounting, the valve housing abuts against the securing element and prevents the valve housing from separating from the mounting; and operating the combustion engine such that the first end opening is higher than the second end opening with respect to gravity.

* * * * *